US010042514B2

United States Patent
Delacroix et al.

(10) Patent No.: US 10,042,514 B2
(45) Date of Patent: Aug. 7, 2018

(54) TYPEAHEAD FEATURES

(71) Applicant: Microsoft Technology Licensing, LLC, Redmond, WA (US)

(72) Inventors: Erin Louise Delacroix, Vallejo, CA (US); Christina Lynn Lopus, San Francisco, CA (US); James Lee Baker, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 405 days.

(21) Appl. No.: 14/529,002

(22) Filed: Oct. 30, 2014

(65) Prior Publication Data

US 2016/0124585 A1 May 5, 2016

(51) Int. Cl.
*G06F 3/0482* (2013.01)
*G06F 3/0484* (2013.01)
(Continued)

(52) U.S. Cl.
CPC ........ *G06F 3/0482* (2013.01); *G06F 3/04817* (2013.01); *G06F 3/04842* (2013.01);
(Continued)

(58) Field of Classification Search
CPC ............... G06F 3/0482; G06F 3/04817; G06F 3/04842; G06F 17/30392; G06F 17/30398; G06F 17/30554; G06F 17/30598
See application file for complete search history.

(56) References Cited

U.S. PATENT DOCUMENTS 5,099,436 A * 3/1992 McCown ............ G06F 11/2257 702/82
5,426,781 A * 6/1995 Kaplan ............ G06F 17/30398
(Continued)

FOREIGN PATENT DOCUMENTS

WO     WO-03009090 A2    1/2003
WO     WO-2016069049 A1    5/2016

OTHER PUBLICATIONS

"International Application Serial No. PCT/US2015/022830, International Search Report dated Jul. 2, 2015", 4 pgs.
(Continued)

*Primary Examiner* — Jung-Mu T Chuang
(74) *Attorney, Agent, or Firm* — Schwegman Lundberg & Woessner, P.A.

(57) ABSTRACT

Techniques for providing improved typeahead features are described. According to various embodiments, it is determined that a user has specified, via a user interface, a first metric term. A list of one or more suggested operators associated with the first metric term is then generated and displayed, and it is determined that the user has selected one of the suggested operators. Thereafter, a list of one or more suggested metric terms associated with the selected operator is generated and displayed, and it is determined that the user has selected a second metric term from the suggested metric terms. Thereafter, a custom metric definition data entity that references information defining a custom metric is generated, the information specifying that metric values associated with the custom metric are generated by processing metric values associated with the first metric term and the second metric term based on the selected operator.

20 Claims, 13 Drawing Sheets

(51) Int. Cl.
*G06F 3/0481* (2013.01)
*G06F 17/30* (2006.01)

(52) U.S. Cl.
CPC .. *G06F 17/30392* (2013.01); *G06F 17/30398* (2013.01); *G06F 17/30554* (2013.01); *G06F 17/30598* (2013.01)

(56) References Cited

U.S. PATENT DOCUMENTS

| | | | | |
|---|---|---|---|---|
| 5,963,938 A * | 10/1999 | Wilson | | G06F 17/30637 |
| 6,285,998 B1 * | 9/2001 | Black | | G06F 17/30392 |
| 6,400,996 B1 * | 6/2002 | Hoffberg | | G05B 19/0426 |
| | | | | 370/218 |
| 6,564,213 B1 * | 5/2003 | Ortega | | G06F 17/3064 |
| 6,947,928 B2 * | 9/2005 | Dettinger | | G06F 17/3064 |
| 7,346,839 B2 * | 3/2008 | Acharya | | G06F 17/30864 |
| 7,720,842 B2 * | 5/2010 | Shringeri | | G06F 17/30398 |
| | | | | 707/722 |
| 7,756,855 B2 * | 7/2010 | Ismalon | | G06F 17/3064 |
| | | | | 707/713 |
| 7,809,719 B2 * | 10/2010 | Furuuchi | | G06F 17/276 |
| | | | | 707/723 |
| 7,908,183 B2 * | 3/2011 | Jacobi | | G06Q 30/02 |
| | | | | 705/14.53 |
| 7,941,762 B1 * | 5/2011 | Tovino | | H04L 51/046 |
| | | | | 379/201.01 |
| 8,010,465 B2 * | 8/2011 | Badger | | G06F 3/0237 |
| | | | | 706/11 |
| 8,131,748 B2 * | 3/2012 | Held | | G06F 17/30967 |
| | | | | 707/769 |
| 8,175,989 B1 * | 5/2012 | Gopinath | | G06N 7/005 |
| | | | | 706/45 |
| 8,239,406 B2 * | 8/2012 | Faunce | | G06F 17/30448 |
| | | | | 707/770 |
| 8,386,519 B2 * | 2/2013 | Kenedy | | G06Q 30/02 |
| | | | | 707/784 |
| 8,504,437 B1 * | 8/2013 | Agarwal | | G06F 17/30 |
| | | | | 705/14.54 |
| 8,543,936 B2 * | 9/2013 | Neale | | G06F 17/30637 |
| | | | | 707/706 |
| 8,626,545 B2 * | 1/2014 | Van Pelt | | G06Q 10/06398 |
| | | | | 705/317 |
| 8,667,009 B2 * | 3/2014 | Voigt | | H04L 51/32 |
| | | | | 705/14.53 |
| 8,793,266 B2 * | 7/2014 | Ishikawa | | G06F 17/30643 |
| | | | | 707/758 |
| 8,875,055 B1 * | 10/2014 | Zeiger | | G06F 19/345 |
| | | | | 715/262 |
| 8,942,986 B2 * | 1/2015 | Cheyer | | G06F 17/3087 |
| | | | | 704/275 |
| 8,965,909 B2 * | 2/2015 | Herron | | G06F 17/30477 |
| | | | | 706/12 |
| 9,251,137 B2 * | 2/2016 | Chen | | G06F 17/276 |
| 9,317,605 B1 * | 4/2016 | Zivkovic | | G06F 17/30864 |
| 9,336,300 B2 * | 5/2016 | Xie | | G06Q 50/01 |
| 2003/0018634 A1 * | 1/2003 | Shringeri | | G06F 17/30398 |
| 2003/0163455 A1 * | 8/2003 | Dettinger | | G06F 17/3064 |
| 2003/0237065 A1 * | 12/2003 | Matsuzaki | | G06F 17/504 |
| | | | | 716/107 |
| 2004/0009813 A1 * | 1/2004 | Wind | | A63F 13/10 |
| | | | | 463/30 |
| 2004/0254928 A1 * | 12/2004 | Vronay | | G06F 17/30401 |
| 2005/0071741 A1 * | 3/2005 | Acharya | | G06F 17/30864 |
| | | | | 715/208 |
| 2006/0036398 A1 * | 2/2006 | Funge | | G06N 5/02 |
| | | | | 702/179 |
| 2006/0064411 A1 * | 3/2006 | Gross | | G06F 17/30864 |
| 2006/0195362 A1 * | 8/2006 | Jacobi | | G06Q 30/02 |
| | | | | 705/343 |
| 2007/0260567 A1 * | 11/2007 | Funge | | A63F 13/10 |
| | | | | 706/47 |
| 2007/0266017 A1 * | 11/2007 | Held | | G06F 17/30967 |
| 2008/0065617 A1 * | 3/2008 | Burke | | G06F 17/30646 |
| 2008/0320411 A1 * | 12/2008 | Chen | | G06F 3/0237 |
| | | | | 715/780 |
| 2009/0182741 A1 * | 7/2009 | Chen | | G06F 3/0237 |
| 2009/0271700 A1 * | 10/2009 | Chen | | G06F 17/276 |
| | | | | 715/261 |
| 2009/0288064 A1 * | 11/2009 | Yen | | G06N 5/02 |
| | | | | 717/106 |
| 2010/0114654 A1 * | 5/2010 | Lukose | | G06Q 30/00 |
| | | | | 705/14.54 |
| 2011/0004595 A1 * | 1/2011 | Yamagishi | | G06F 17/30616 |
| | | | | 707/739 |
| 2011/0035400 A1 * | 2/2011 | Nishida | | G06Q 30/02 |
| | | | | 707/769 |
| 2011/0184813 A1 * | 7/2011 | Barnes | | G06F 17/30867 |
| | | | | 705/14.66 |
| 2011/0289088 A1 * | 11/2011 | Yarin | | G06F 17/30781 |
| | | | | 707/738 |
| 2011/0320470 A1 * | 12/2011 | Williams | | G06F 17/30864 |
| | | | | 707/767 |
| 2012/0084328 A1 * | 4/2012 | Ishikawa | | G06F 17/30651 |
| | | | | 707/805 |
| 2012/0117102 A1 * | 5/2012 | Meyerzon | | G06F 17/3064 |
| | | | | 707/767 |
| 2012/0150911 A1 * | 6/2012 | Arquie | | G06F 17/30398 |
| | | | | 707/780 |
| 2012/0159317 A1 * | 6/2012 | Di Cocco | | G06F 3/0237 |
| | | | | 715/261 |
| 2012/0185486 A1 * | 7/2012 | Voigt | | H04L 51/32 |
| | | | | 707/741 |
| 2012/0203639 A1 * | 8/2012 | Webster | | G06Q 30/0269 |
| | | | | 705/14.66 |
| 2012/0246173 A1 * | 9/2012 | Wittmer | | G06F 17/30991 |
| | | | | 707/749 |
| 2013/0080412 A1 * | 3/2013 | Kritt | | G06F 17/30696 |
| | | | | 707/706 |
| 2013/0218596 A1 * | 8/2013 | Gome | | G06Q 10/06 |
| | | | | 705/3 |
| 2014/0040245 A1 * | 2/2014 | Rubinstein | | G06F 17/30528 |
| | | | | 707/722 |
| 2014/0040285 A1 * | 2/2014 | Rubinstein | | G06F 17/3053 |
| | | | | 707/751 |
| 2014/0188899 A1 * | 7/2014 | Whitnah | | G06F 17/30646 |
| | | | | 707/749 |
| 2014/0280290 A1 * | 9/2014 | Baumgartner | | G06F 17/3097 |
| | | | | 707/767 |
| 2015/0161239 A1 * | 6/2015 | Stepinski | | G06F 17/30 |
| | | | | 707/765 |
| 2015/0205858 A1 * | 7/2015 | Xie | | G06Q 50/01 |
| | | | | 707/755 |
| 2015/0310006 A1 * | 10/2015 | Becker | | G06F 17/30011 |
| | | | | 707/608 |
| 2016/0092511 A1 * | 3/2016 | Liu | | G06F 17/30554 |
| | | | | 707/770 |

OTHER PUBLICATIONS

"International Application Serial No. PCT/US2015/022830, Written Opinion dated Jul. 2, 2015", 11 pgs.
"International Application Serial No. PCT/US2015/022830, International Preliminary Report on Patentability dated May 11, 2017", 13 pgs.

* cited by examiner

| METRIC TERM | OPERATOR |
|---|---|
| TERM 1 | OPERATOR A, OPERATOR B, OPERATOR C |
| TERM 2 | OPERATOR A, OPERATOR C, OPERATOR D |
| TERM 3 | OPERATOR D, OPERATOR E, OPERATOR F |
| TERM 4 | OPERATOR B, OPERATOR D, OPERATOR F |
| ... | ... |

600

| OPERATOR | METRIC TERM |
|---|---|
| OPERATOR 1 | METRIC TERM A, METRIC TERM B, METRIC TERM C |
| OPERATOR 2 | METRIC TERM D, METRIC TERM E, METRIC TERM F |
| OPERATOR 3 | METRIC TERM G, METRIC TERM H, METRIC TERM I |
| OPERATOR 4 | METRIC TERM J, METRIC TERM K, METRIC TERM L |
| ... | ... |

| DOMAIN | MOBILE X | DATASET | ACTIVATIONS X | METRIC(S) | UNIQUEUSERS BY TOTALACTIONCOUNT X | ACTIVATIONS X |
|---|---|---|---|---|---|---|
| | | | | | TOTALACTIONCOUNT X | UNIQUEUSERS X | PAGEVIEWS X |

| FILTERS | AND | COUNTRY X | EQUALS ⌄ | UNITED STATES X | CANADA X | CHINA X |

APR 1, 2013 — JULY 1, 2013 ⌄ — 802

TOTAL ⌄    TOP 5 ⌄

| DATE | UNIQUEUSERS | ACTIVATIONS | UNIQUEUSERS BY ACTIONCOUNT | TOTALACTIONCOUNT | PAGEVIEWS |
|---|---|---|---|---|---|
| 03.06.13 | 458.95B +23.96% | 458.95B +23.96% | 458.95B +23.96% | 458.95B +23.96% | 458.95B +23.96% |
| 03.05.13 | 0.38M +133.58% | 0.38M +133.58% | 0.38M +133.58% | 0.38M +133.58% | 0.38M +133.58% |
| 03.04.13 | 792.21K +115.80% | 792.21K +115.80% | 792.21K +115.80% | 792.21K +115.80% | 792.21K +115.80% |
| 03.03.13 | 45.36M −0.36% | 45.36M −0.36% | 45.36M −0.36% | 45.36M −0.36% | 45.36M −0.36% |

Fig. 8

TYPEAHEAD FEATURES

TECHNICAL FIELD

The present application relates generally to data processing systems and, in one specific example, to techniques for providing improved typeahead features.

BACKGROUND

In computing, a typeahead feature is a user interface interaction method to progressively search for and filter through text. As the user types text, one or more possible matches for the text are found and immediately presented to the user. This immediate feedback often allows the user to stop short of typing the entire word or phrase they were looking for. This feature has also been referred to as Autocomplete, search as you type, filter/find as you type (FAYT), incremental search, incremental find, real-time suggestions, typeahead search, inline search, instant search, and word wheeling.

BRIEF DESCRIPTION OF THE DRAWINGS

Some embodiments are illustrated by way of example and not limitation in the figures of the accompanying drawings in which:

FIG. 6 illustrates examples of data structures, according to various embodiments;

FIG. 8 illustrates an example portion of a user interface, according to various embodiments;

DETAILED DESCRIPTION

Example methods and systems for providing improved typeahead features are described. In the following description, for purposes of explanation, numerous specific details are set forth in order to provide a thorough understanding of example embodiments. It will be evident, however, to one skilled in the art that the embodiments of the present disclosure may be practiced without these specific details.

According to various example embodiments described herein, a typeahead control system is configured to provide improved typeahead features, such as in conjunction with a text entry user interface element (such as a search bar or search query bar). More specifically, the improved typeahead feature described herein provides a user with suggestions for different types of information, such as terms and operators, from different data sources, in order to generate complex queries, requests, or definitions.

For example, in conventional search query bars, when the user begins to enter characters of a search term, a system may perform a search based on the entered characters in order to display a list of suggested results. In other words, traditional typeahead features provide search results of basic words that match the characters being entered by the user. In contrast, the system described herein may provide the user with suggestions for terms before the user has even entered any characters. Further, the system described herein is configured to provide the user with suggestions for different types of entities, such as terms (e.g., metric terms), operators, values, and so. For example, according to various example embodiments, as soon as the user places their cursor in a search bar, the system may display a list of suggested results (e.g., the first X number of results) of terms that the user can choose from in that context. Thus, the user can select and specify a term from the suggested list of terms, such as the metric "no. of page views". Once the user hits the spacebar or tab button, the data source utilized by the typeahead feature to generate suggested inputs is changed to a different data source that provides operators. Thus, the system may provide a list of suggested operators applicable to the already specified term, and the user can select from this list and specify an operator, such as "divided by". Thereafter, when the user again hits the spacebar or tab button, the system may display suggested results from another data source, such as a list of terms applicable to the already specified term and operator combination. Thus, the user can select and specify another term such as the metric "no. of users". Accordingly, the embodiments described herein provide for an improved typeahead feature that enables a user to compound multiple data sources into a complex query, such as the query "no. of page views divided by no. of unique users".

Figure 1:
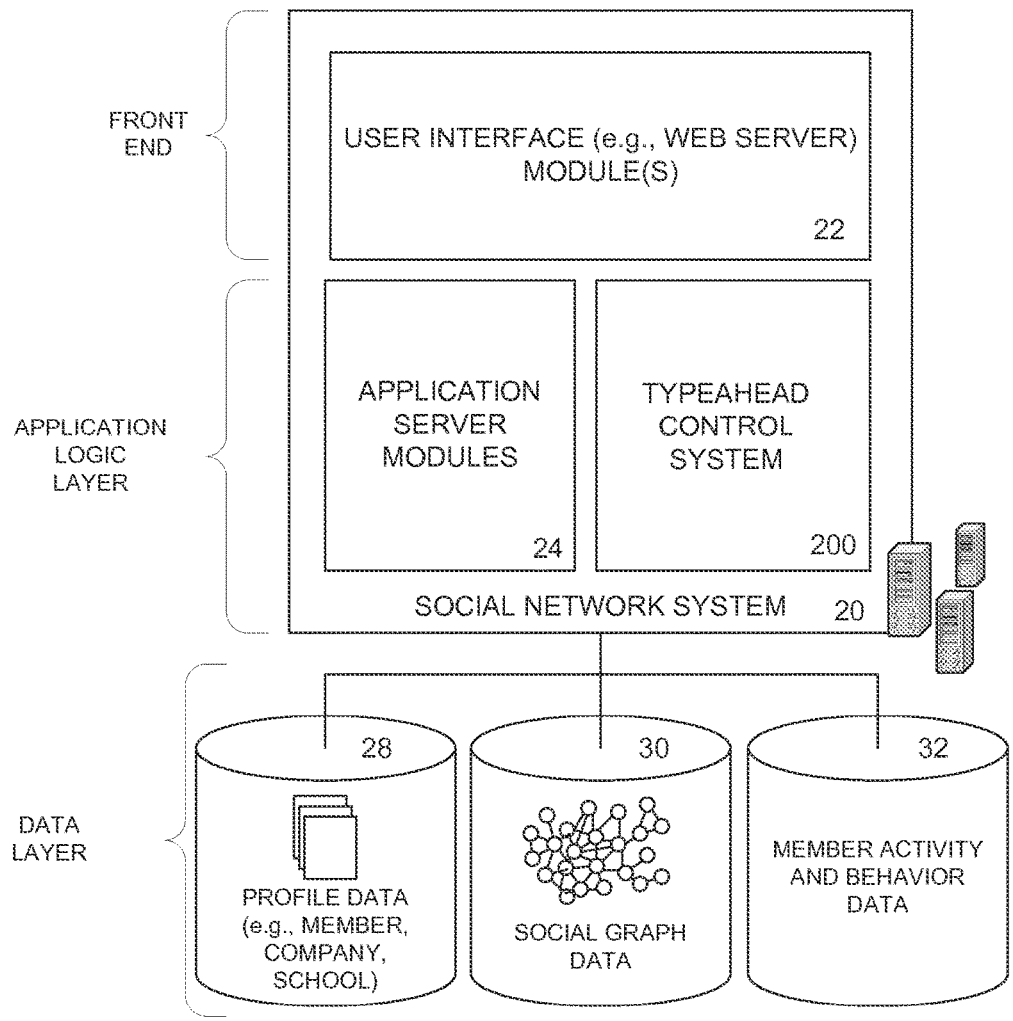
FIG. 1 is a block diagram showing the functional components of a social networking service, consistent with some embodiments of the present disclosure.

FIG. 1 is a block diagram illustrating various components or functional modules of a social network service such as the social network system 20, consistent with some embodiments. As shown in FIG. 1, the front end consists of a user interface module (e.g., a web server) 22, which receives requests from various client-computing devices, and communicates appropriate responses to the requesting client devices. For example, the user interface module(s) 22 may receive requests in the form of Hypertext Transport Protocol (HTTP) requests, or other web-based, application programming interface (API) requests. The application logic layer includes various application server modules 14, which, in conjunction with the user interface module(s) 22, generates various user interfaces (e.g., web pages) with data retrieved from various data sources in the data layer. With some embodiments, individual application server modules 24 are used to implement the functionality associated with various services and features of the social network service. For instance, the ability of an organization to establish a presence in the social graph of the social network service, including the ability to establish a customized web page on behalf of an organization, and to publish messages or status updates on behalf of an organization, may be services implemented in independent application server modules 24.

Similarly, a variety of other applications or services that are made available to members of the social network service will be embodied in their own application server modules 24.

As shown in FIG. 1, the data layer includes several databases, such as a database 28 for storing profile data, including both member profile data as well as profile data for various organizations. Consistent with some embodiments, when a person initially registers to become a member of the social network service, the person will be prompted to provide some personal information, such as his or her name, age (e.g., birthdate), gender, interests, contact information, hometown, address, the names of the member's spouse and/or family members, educational background (e.g., schools, majors, matriculation and/or graduation dates, etc.), employment history, skills, professional organizations, and so on. This information is stored, for example, in the database with reference number 28. Similarly, when a representative of an organization initially registers the organization with the social network service, the representative may be prompted to provide certain information about the organization. This information may be stored, for example, in the database with reference number 28, or another database (not shown). With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph, shown in FIG. 1 with reference number 30.

The social network service may provide a broad range of other applications and services that allow members the opportunity to share and receive information, often customized to the interests of the member. For example, with some embodiments, the social network service may include a photo sharing application that allows members to upload and share photos with other members. With some embodiments, members may be able to self-organize into groups, or interest groups, organized around a subject matter or topic of interest. With some embodiments, the social network service may host various job listings providing details of job openings with various organizations.

As members interact with the various applications, services and content made available via the social network service, the members' behavior (e.g., content viewed, links or member-interest buttons selected, etc.) may be monitored and information concerning the member's activities and behavior may be stored, for example, as indicated in FIG. 1 by the database with reference number 32.

With some embodiments, the social network system 20 includes what is generally referred to herein as a typeahead control system 200. The typeahead control system 200 is described in more detail below in conjunction with FIG. 2.

Although not shown, with some embodiments, the social network system 20 provides an application programming interface (API) module via which third-party applications can access various services and data provided by the social network service. For example, using an API, a third-party application may provide a user interface and logic that enables an authorized representative of an organization to publish messages from a third-party application to a content hosting platform of the social network service that facilitates presentation of activity or content streams maintained and presented by the social network service. Such third-party applications may be browser-based applications, or may be operating system-specific. In particular, some third-party applications may reside and execute on one or more mobile devices (e.g., phone, or tablet computing devices) having a mobile operating system.

Figure 2:
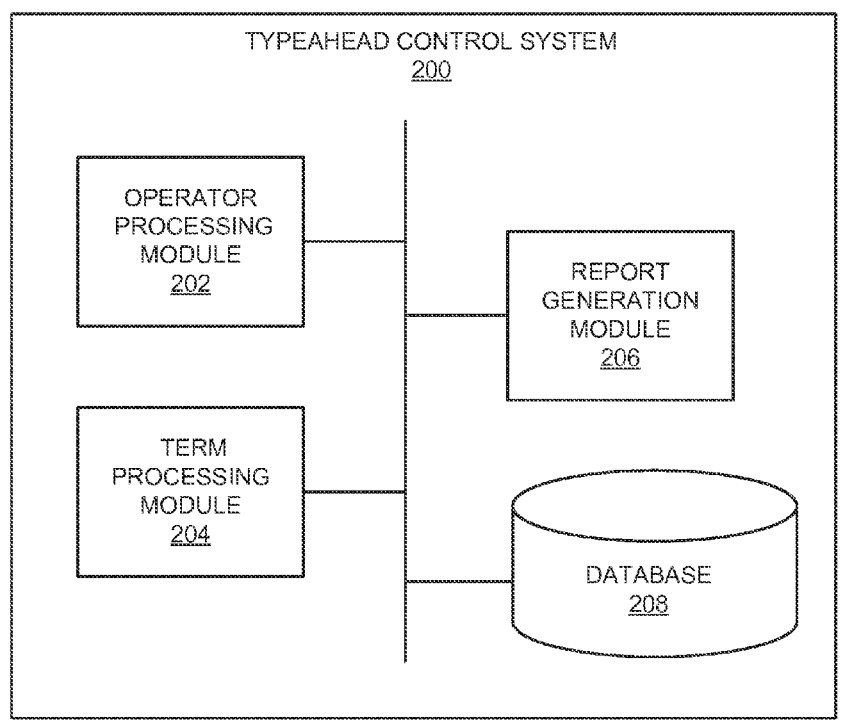
FIG. 2 is a block diagram of an example system, according to various embodiments.

Turning now to FIG. 2, a typeahead control system 200 includes an operator processing module 202, a term processing module 204, a report generation module 206, and a database 208. The modules of the typeahead control system 200 may be implemented on or executed by a single device such as a typeahead control device, or on separate devices interconnected via a network. The aforementioned typeahead control device may be, for example, one or more client machines or application servers. The operation of each of the aforementioned modules of the typeahead control system 200 will now be described in greater detail in conjunction with the figures.

As described herein, an improved typeahead feature provides a user with suggestions for different types of information from different data sources, such as terms and operators, in order to generate complex queries, requests, or definitions. Such an improved typeahead feature may be useful in, for example, the context of metrics and generating metric reports. For example, the operation of an online business, website, or social network service such as LinkedIn® may be improved by tracking a large number of metrics, such as number of unique users, number of logins, number of page views, and so on. Accordingly, a reporting tool may provide a text entry user interface element such as a search bar that enables a user to specify a metric such as "no. of unique users" and a time range such as "Jul. 1, 2014", in order to view the number of unique users for that time period.

Figure 3:
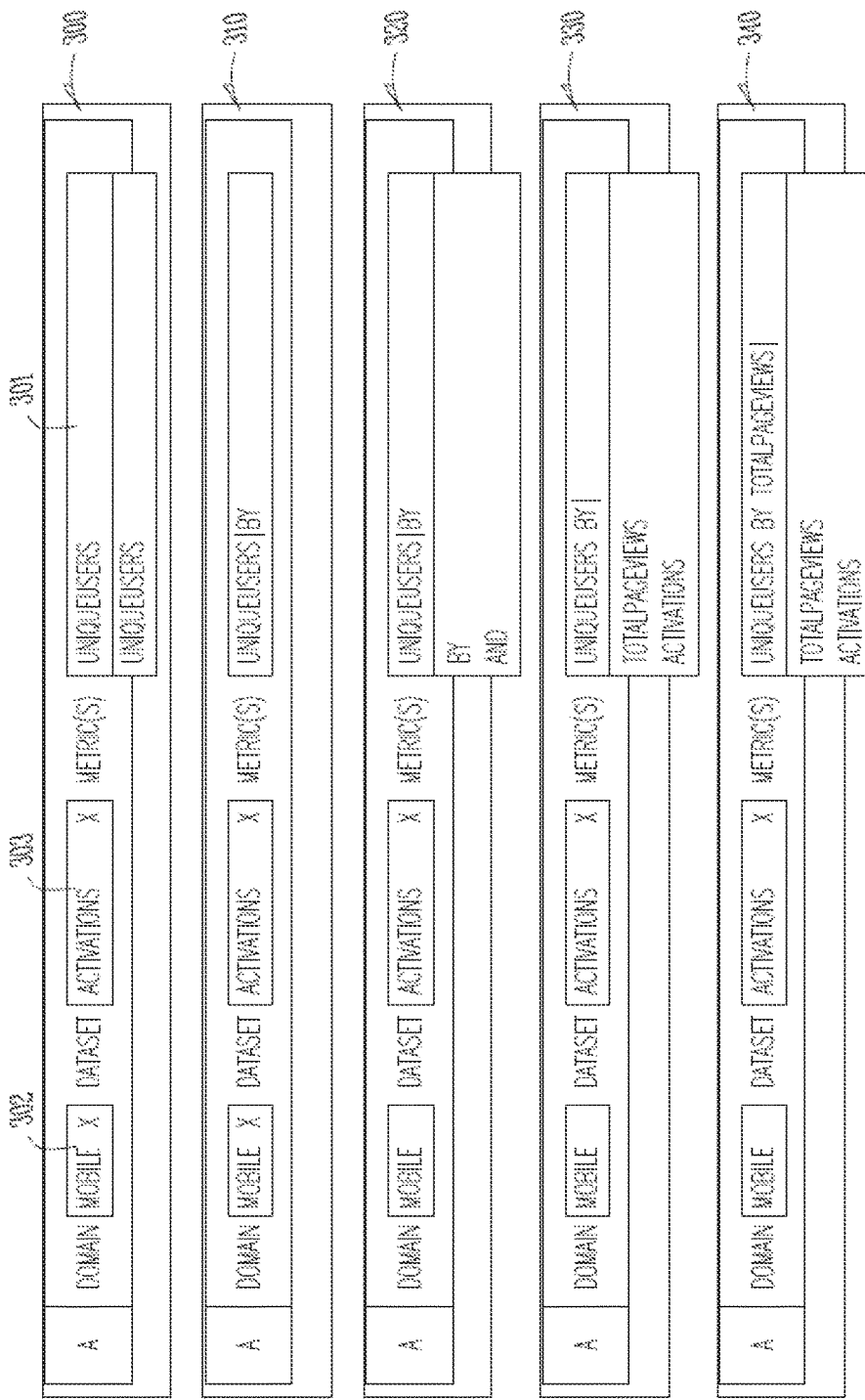
FIG. 3 illustrates example portions of user interfaces, according to various embodiments.
Figure 4:
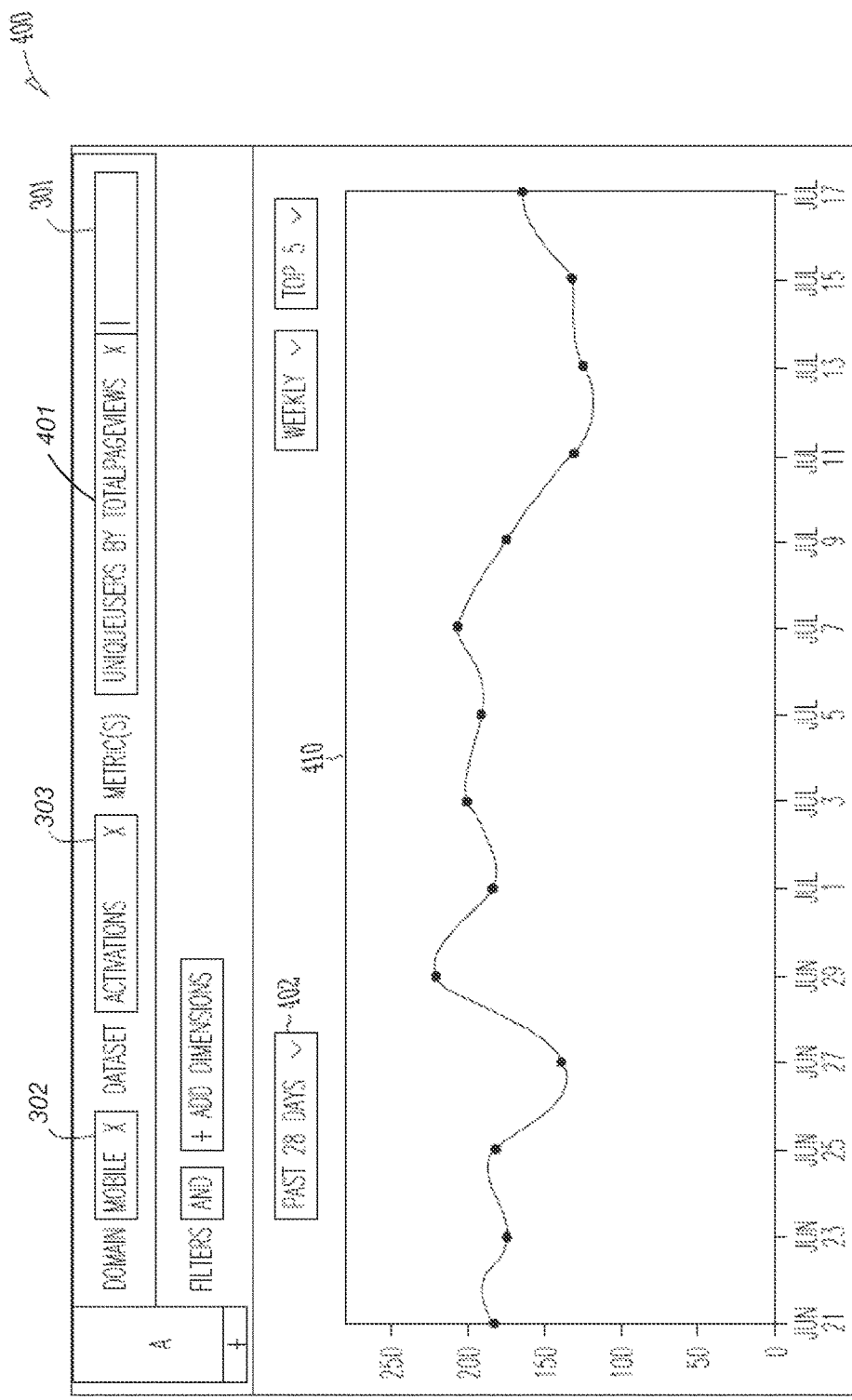
FIG. 4 illustrates an example portion of a user interface, according to various embodiments.

For example, FIG. 3 illustrates examples of different states of a search query bar 301 displayed by the system 200 (e.g., in conjunction with a metric reporting tool/function) that generates reports regarding various metrics (e.g., metrics associated with the operation of an online website or online social network service such as LinkedIn®). For example, the user may select various categories of metrics by selecting a "domain" 302 (corresponding to a high-level folder or category of metrics), as well as a "dataset" 303 (corresponding to subfolders or subcategories of metrics). In the example of FIG. 4, the user has selected the domain 302 of "mobile" (representing metric data associated with mobile interactions with an online social network service, as opposed to interactions via desktop computers), and the user has selected the dataset 303 of "activations" (representing metric data associated with the activation process for a mobile application).

As illustrated in state 300 in FIG. 3, the user has begun to enter the name of the metric "UniqueUsers" (representing a number of unique users that have interacted with online content) in the search query bar 301. More specifically, as the user has begun to type the characters "UniqueU", the typeahead control system 200 has displayed matching metric terms including "UniqueUsers". State 310 illustrates the search bar 301 after the user has selected the suggested item "UniqueUsers".

Thereafter, as illustrated in state 320, when the user presses the spacebar or tab button or provides some other predefined input, the typeahead control system 200 automatically generates a list of suggested operators (e.g., "by", "and", etc.) that are applicable to the already specified metric "UniqueUsers". Accordingly, the user may select one of these suggested operators, such as "by" (corresponding to a division operation). Thereafter, if the user again presses the spacebar or tab button, then as shown in state 330, the typeahead control system 200 may display a list of more metric terms (e.g., TotalPageViews, Activations, etc.) that may be applied to the already specified metric term "UniqueUsers" and the already specified operator "by". For example, the user may select one of these suggested metric terms such as "TotalPageViews", as illustrated in state 340. Thus, the resulting string or a query includes a metric term ("UniqueUsers"), followed by an operator ("by") followed by another metric term ("TotalPageViews"), thereby defining a new custom metric corresponding to: the number of unique users divided by the total number of page views.

If the user selects the "enter" button or provides some other predefined input then, as illustrated in FIG. 4, the typeahead control system 200 may store this search string describing the new custom metric as a discrete data entity 401, referred to herein as a custom metric definition data entity. As seen in FIG. 4, the typeahead control system 200 may display an icon or other indicia in the search bar 301 that represents the custom metric definition discrete data entity 401 and which indicates that, in fact, the search query and customized metric definition information has been stored as a discrete data entity. In some embodiments, the custom metric definition data entity may correspond to data stored in a data table or similar data structure in the database (e.g., database 208 illustrated in FIG. 2).

Moreover, as illustrated in FIG. 4, a reporting tool associated with the typeahead control system 200 may display metric values associated with a user-defined custom metric. For example, the user may specify a time period via time period specification element 402, and the typeahead control system 200 may display metric values associated with the custom metric for the selected time period in window 410. Note that each of the metric values associated with the custom metric will be generated by the typeahead control system 200 based on the definition information referenced by the custom metric definition data entity 401. For example, for the time period July 1, the typeahead control system 200 may access the number of unique users recorded on July 1, and divide it by the number of total page views recorded on July 1. As illustrated in FIG. 4, the typeahead control system 200 may display these custom metric values in the form of a chart. Thus, the typeahead control system 200 described herein is configured to provide an improved typeahead feature whereby the user is presented with a list of suggested metric terms and suggested operators in order to more easily generate definitions for customized metrics.

Figure 5:
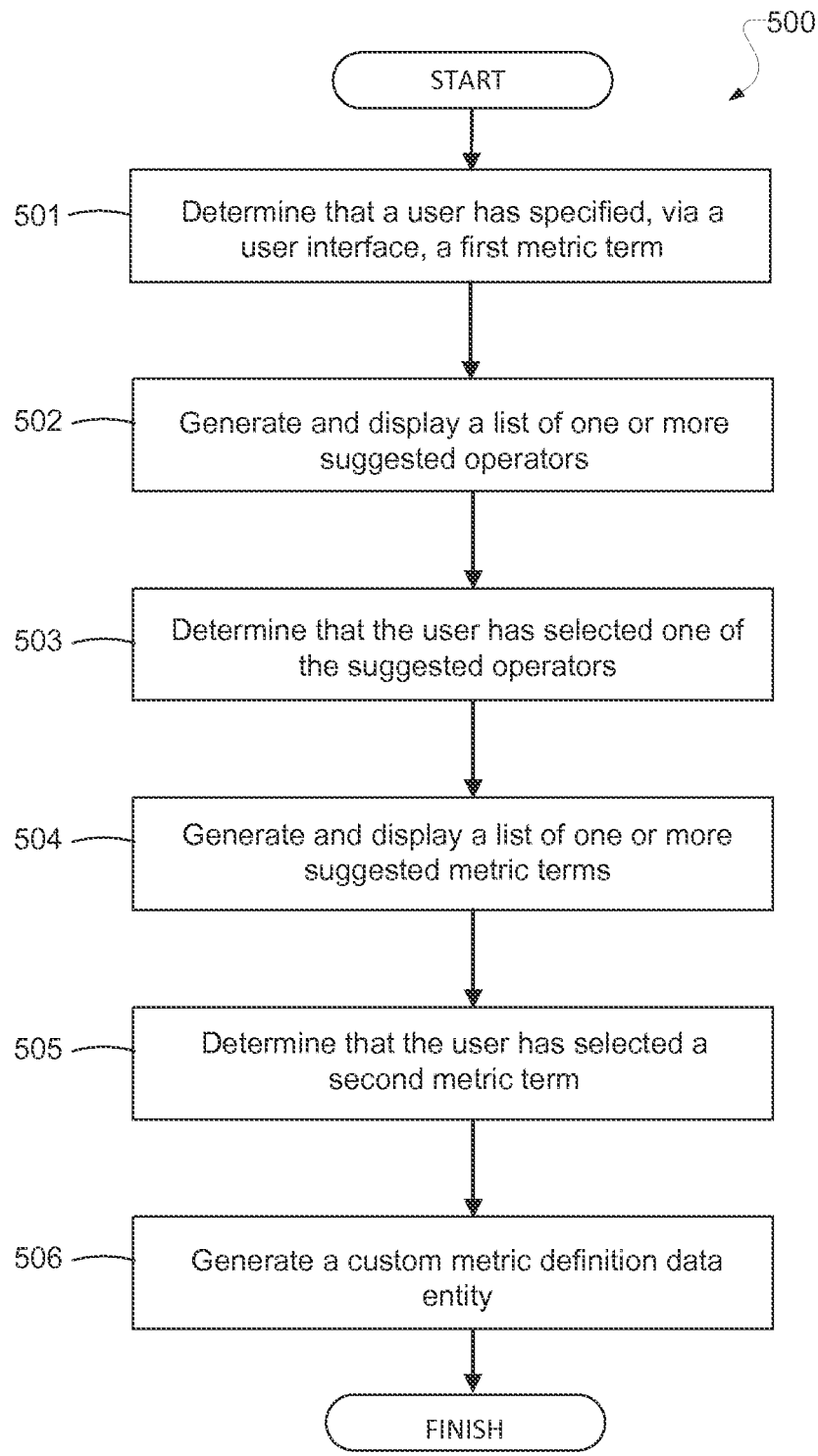
FIG. 5 is a flowchart illustrating an example method, according to various embodiments.

FIG. 5 is a flowchart illustrating an example method 500, consistent with various embodiments described above. The method 500 may be performed at least in part by, for example, the typeahead control system 200 illustrated in FIG. 2 (or an apparatus having similar modules, such as one or more client machines or application servers). In operation 501, the operator processing module 202 determines that a user has specified, via a user interface, a first metric term (e.g., see 310 in FIG. 3). In some embodiments, the user interface is a text entry user interface element. The metric term may be the name of any type of known metric (e.g., number of users), or the value corresponding to a type of metric (e.g., 999). Non-limiting examples of metric terms include a number of unique users, a number of action views, number of total page views, a number of total action counts, a page view counts, page views, and activations.

In operation 502 in FIG. 5, the operator processing module 202 generates a list of one or more suggested operators associated with the first metric term, and displays, via the user interface, the list of suggested operators (e.g., see 320 in FIG. 3). In some embodiments, the user interface is a text entry user interface element, and the list of suggested operators is displayed via a typeahead user interface feature in conjunction with the text entry user interface element. The operators described herein may correspond to any operators known to those skilled in the art, including operators within the fields of mathematics, statistics, computer science, and so on. In some embodiments, the selected operator is an addition (+) operator, a subtraction (−) operator, a multiplication (x) operator, a division (/) operator, an "is" operator, an "is not" operator, an "AND" operator, an "OR" operator, a "NOR" operator, a "XOR" operator, as well as operators such as =, >, <, =>, <=, and so on. In some embodiments, the operator processing module 202 may generate the list of one or more suggested operators associated with the first metric term by accessing a first data structure identifying one or more candidate metric terms and one or more candidate operators associated with each of the candidate metric terms (e.g., see data structure 600 in FIG. 6). The operator processing module 202 may then identify a specific one of the candidate metric terms that corresponds to the first metric term (e.g., Term 3 in table 600 in FIG. 6); and classify the one or more candidate operators associated with the specific candidate metric term (e.g., Operators D, E, and F in table 600 in FIG. 6) as the suggested operators.

In some embodiments, the information in table 600 may be predefined by a user of the typeahead control system 200 (for example, the typeahead control system 200 may display a user interface allowing the user to describe operators associated with each of the various terms). In alternative embodiments, the information may be automatically updated by the typeahead control system 200 based on historical user input. For example, the typeahead control system 200 may update the table 600 to display the top X operators that users have specified after a given metric term.

In operation 503 in FIG. 5, the operator processing module 202 determines that the user has selected, via the user interface, one of the suggested operators included in the displayed list of suggested operators. In operation 504, the term processing module 204 generates a list of one or more suggested metric terms associated with the selected operator, and displays, via the user interface, the list of suggested metric terms (e.g., see 330 in FIG. 3). In some embodiments, the user interface is a text entry user interface element, and the additional list of additional metric terms are displayed via a typeahead user interface feature in conjunction with the text entry user interface element. In some embodiments, the term processing module 204 may generate the list of one or more suggested metric terms associated with the selected operator by accessing a second data structure identifying one or more candidate operators and one or more candidate metric terms associated with each of the candidate operators (e.g., see data structure 601 in FIG. 6). The term processing module 204 may then identify a specific one of the candidate operators (e.g., Operator 4 in table 601 in FIG. 6) that corresponds to the selected operator, and classify the one or more candidate metric terms associated with the specific candidate operator (e.g., operators J, K, and L in table 601 in FIG. 6) as the suggested metric terms.

In some embodiments, the information in table 601 may be predefined by a user of the typeahead control system 200 (for example, the typeahead control system 200 may display a user interface allowing the user to describe operators associated with each of the various terms). In alternative embodiments, the information may be automatically updated by the typeahead control system 200 based on historical user input. For example, the typeahead control system 200 may update the information in table 601 to display the top X operators that users have specified after a given metric term.

In operation 505 in FIG. 5, the term processing module 204 determines that the user has selected, via the user interface, a second metric term from the suggested metric terms included in list of suggested metric terms (e.g., see 340 in FIG. 3). In operation 506, the report generation module 206 generates a custom metric definition data entity that references information defining a custom metric, the information specifying that metric values associated with the custom metric are generated by processing metric values associated with the first metric term and metric values associated with the second metric term based on the selected operator. See FIG. 4. The custom metric definition data entity may be stored locally at, for example, the database 208 illustrated in FIG. 2, or may be stored remotely at a database, data repository, storage server, etc., that is accessible by the typeahead control system 200 via a network (e.g., the Internet). It is contemplated that the operations of method 500 may incorporate any of the other features disclosed herein. Various operations in the method 500 may be omitted or rearranged, as necessary.

In some embodiments, the operator processing module 202 may assist the user in specifying the first metric term in operation 501 in FIG. 5. For example, as soon as the user clicks in the search bar 301, and before the user has typed any characters, the operator processing module 202 may display a list of suggested metric values (e.g., by accessing a data structure listing all possible metrics values associated with a given domain and/or dataset), and the user may select from one of the suggested metric values. Instead or in addition, the user may begin typing, and the operator processing module 202 may detect user entry of one or more characters associated with a metric term, perform a search of a data structure, based on the one or more characters (e.g., a data structure listing all possible metrics values associated with a given domain and/or dataset), display one or more search results associated with the search as a list of suggested metric terms, and receive a user selection of one of the search results.

In some embodiments, the operator processing module 202 determines that the user has specified the first metric term (see operation 501 in FIG. 5) by detecting user entry of a whitespace character subsequent to user entry of the first metric term. Moreover, the list of one or more suggested operators may be generated and displayed, responsive to the user entry of the whitespace character. In some embodiments (see operation 502 in FIG. 5), the list of one or more suggested operators is generated and displayed prior to user entry of any additional character subsequent to the aforementioned whitespace character.

In some embodiments, the term processing module 204 determines that the user has selected one of the suggested operators (see operation 503 in FIG. 5) by detecting user entry of a whitespace character subsequent to the user selection of the selected operator. Moreover, the list of one or more suggested metric terms is generated and displayed (see operation 504 in FIG. 5), responsive to the user entry of the whitespace character. In some embodiments, the list of one or more suggested metric terms is generated and displayed, prior to user entry of any additional character subsequent to the whitespace character.

Figure 7:
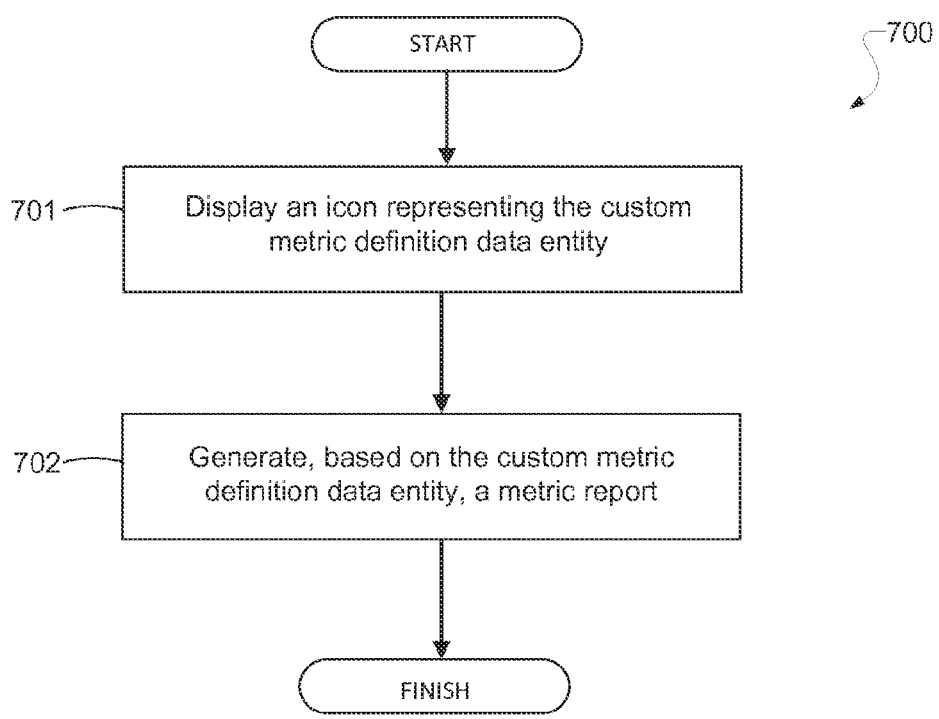
FIG. 7 is a flowchart illustrating an example method, according to various embodiments.

FIG. 7 is a flowchart illustrating an example method 700, consistent with various embodiments described above. The method 700 may be performed at least in part by, for example, the typeahead control system 200 illustrated in FIG. 2 (or an apparatus having similar modules, such as one or more client machines or application servers). The method 700 may be performed after, for example, the method 500 in FIG. 5. In operation 701, the report generation module 206 displays, via the user interface, an icon representing a custom metric definition data entity. In operation 702, the report generation module 206 generates, based on the custom metric definition data entity, a metric report describing one or more metric values of a custom metric associated with the custom metric definition data entity. In some embodiments, the metric report includes a chart displaying the one or more metric values of the custom metric in association with one or more time values (see FIG. 4). It is contemplated that the operations of method 700 may incorporate any of the other features disclosed herein. Various operations in the method 700 may be omitted or rearranged, as necessary.

Figure 9:
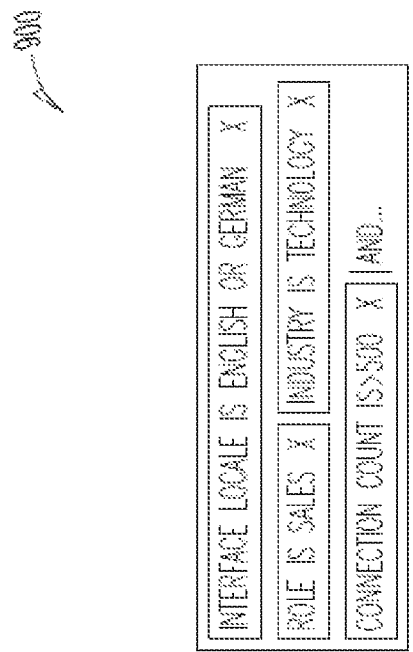
FIG. 9 illustrates an example portion of a user interface, according to various embodiments.

According to various exemplary embodiments, after the user has specified a customized metric (see FIG. 4), the user may repeat the process described above in order to specify additional custom metrics. For example, as illustrated in FIG. 8, the user has specified multiple customized metric definition data entities in search query bar 803, including "UniqueUsers by TotalActionCount", "Activations", "TotalActionCount", "UniqueUsers", and "PageViews". Moreover, as illustrated in FIG. 8, the typeahead control system 200 has displayed metric values associated with each of the customized metrics. For example, the typeahead control system 200 may generate a table in window 803 that includes columns associated with each of the customized metrics, and rows associated with various time values (as specified by time period specification user interface element 802). The typeahead control system 200 then displays the corresponding values for each customized metric for each time value. Thus, the typeahead control system 200 enables the user to view multiple disparate metrics simultaneously in table format, even in cases where the multiple disparate metrics may not easily be viewable in chart format (e.g., due to different axis scaling requirements of the different metrics). The user may simply delete a customized metric in the search bar 801 in order to remove the column associated with that customized metric from the report 802. If the user removes all but one of the customized metrics, the window 803 may display a chart as in FIG. 4. While not all of the customers metrics illustrated in FIG. 8 include a combination of metric terms and operators, it is appreciated that any number of these customized metrics may include a combination of metric terms and operators. For example, FIG. 9 illustrates examples of other customized metric definition data entities such as "role is sales", "industry is technology", and "connection count is >500".

Figure 10:
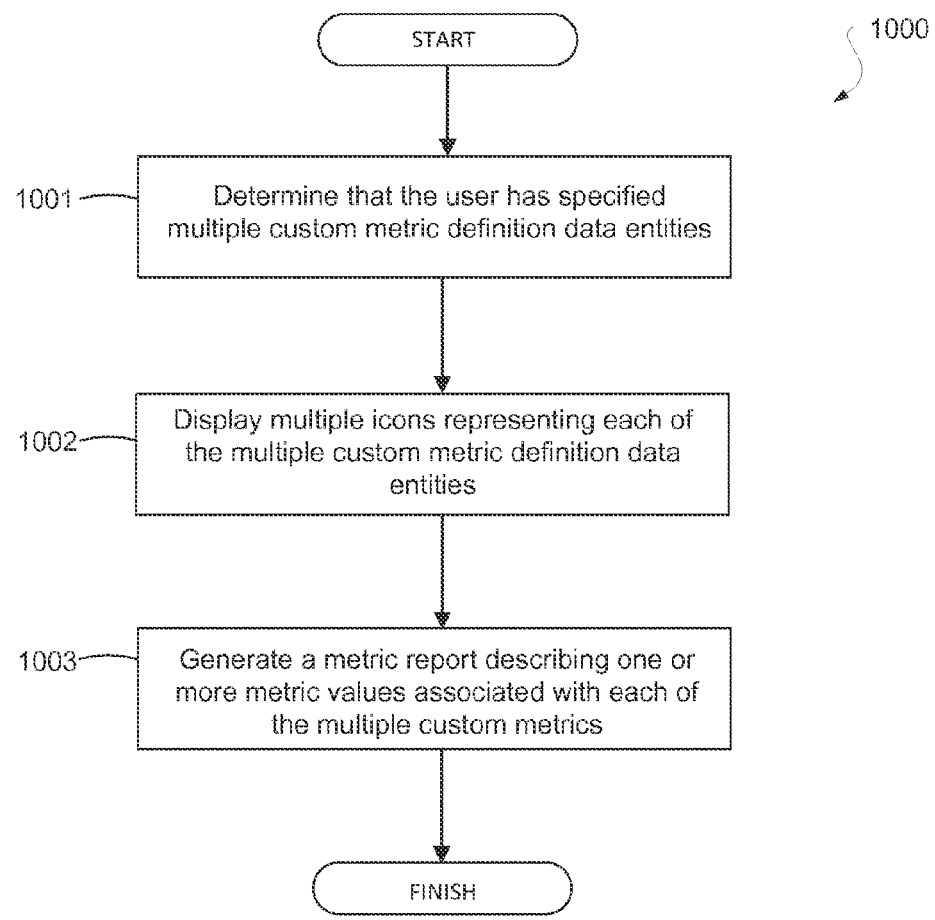
FIG. 10 is a flowchart illustrating an example method, according to various embodiments.

FIG. 10 is a flowchart illustrating an example method 1000, consistent with various embodiments described above. The method 1000 may be performed at least in part by, for example, the typeahead control system 200 illustrated in FIG. 2 (or an apparatus having similar modules, such as one or more client machines or application servers). The method 1000 may be performed after, for example, the method 500 in FIG. 5. In operation 1001, the report generation module 206 determines that a user has specified multiple custom metric definition data entities associated with multiple custom metrics. In operation 1002, the report generation module 206 displays, via a user interface, multiple icons representing each of the multiple custom metric definition data entities (e.g., see FIG. 8). In operation 1003, the report generation module 206 generates, based on the multiple custom metric definition data entities, a metric report describing one or more metric values associated with each of the multiple custom metrics. In some embodiments, the metric report includes a table including multiple columns associated with the multiple custom metrics and further including multiple rows associated with multiple time values, each entry in the table displaying a metric value associated with one of the multiple custom metrics and one of the multiple time values (e.g., see FIG. 8). It is contemplated that the operations of method 1000 may incorporate any of the other features disclosed herein. Various operations in the method 1000 may be omitted or rearranged, as necessary.

While the examples above described customized metrics that include a metric term followed by an operator followed by a metric term, in some embodiments, the typeahead features described herein may be applied continuously to generate more detailed customized metric data entities. For example, the user may generate a customized metric definition data entity that includes a metric term, an operator, a metric term, an operator, and a metric term. An example of such a customized metric definition data entity is illustrated in FIG. 9 as "interface local is English or German", where the operators "is" and "or" are interspersed with metric terms "interface local", "English", and "German". For example, consistent with the techniques described above, after the user enters the metric term "English" in a search query bar, the typeahead control system 200 may display another list of suggested operators, and if the user selects the operator "or", the typeahead control system 200 may display a list of suggested operators that includes "German", for example.

Figure 11:
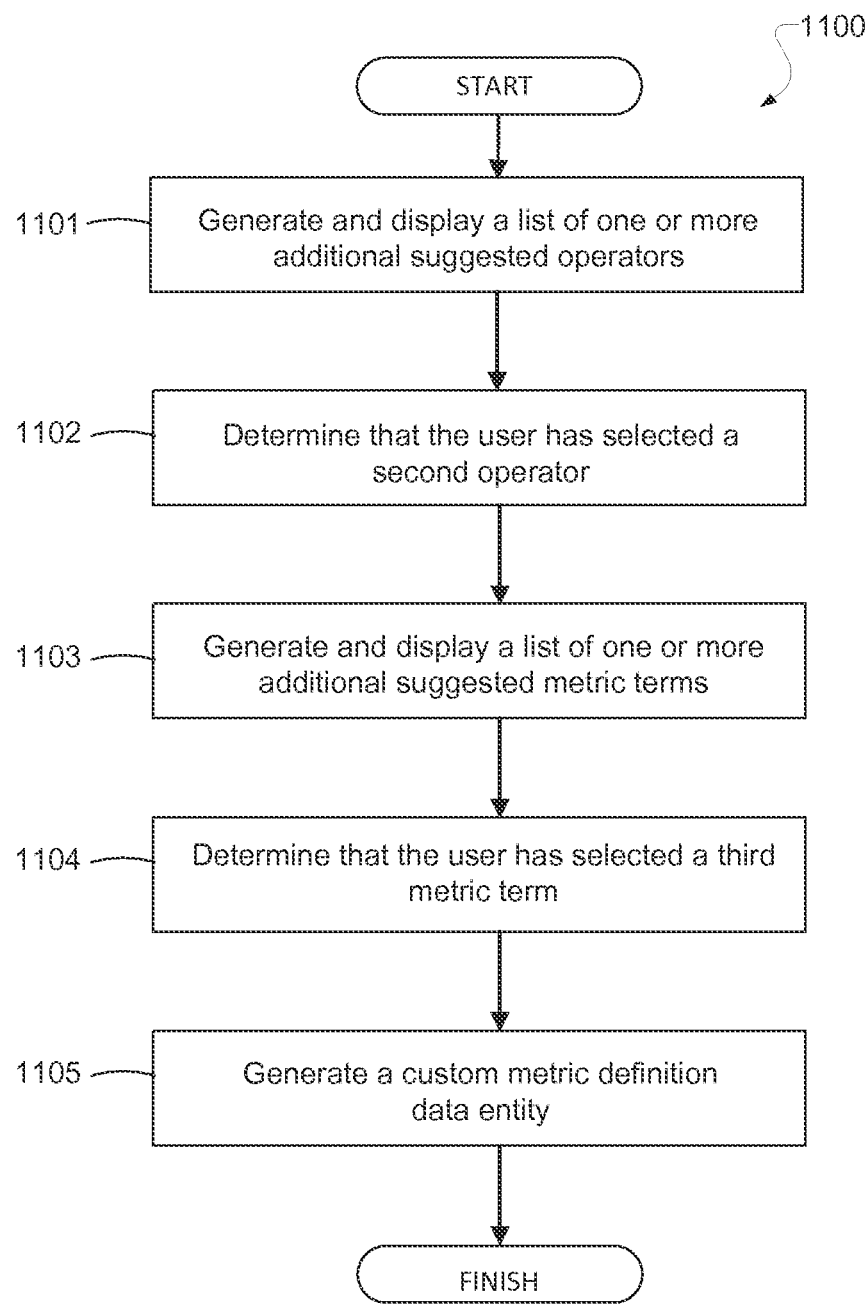
FIG. 11 is a flowchart illustrating an example method, according to various embodiments.

FIG. 11 is a flowchart illustrating an example method 1100, consistent with various embodiments described above. The method 1100 may be performed at least in part by, for example, the typeahead control system 200 illustrated in FIG. 2 (or an apparatus having similar modules, such as one or more client machines or application servers). The method 1100 may be performed after, for example, the method 500 in FIG. 5. In operation 1101, the operator processing module 202 generates a list of one or more additional suggested operators associated with a second metric term, and displays, via the user interface, the list of additional suggested operators. In operation 1102, the operator processing module 202 determines that the user has selected, via the user interface, a second operator from the additional suggested operators included in the list of additional suggested operators. In operation 1103, the term processing module 204 generates a list of one or more additional suggested metric terms associated with the second operator, and displays, via the user interface, the list of additional suggested metric terms associated with the second operator. In operation 1104, the term processing module 204 determines that the user has selected, via the user interface, a third metric term from the additional suggested metric terms included in the list of additional suggested metric terms. In operation 1105, the report generation module 206 generates a custom metric definition data entity that references information defining an additional custom metric, based on the first metric term, the selected operator, the second metric term, the second operator, and the third metric term. It is contemplated that the operations of method 1100 may incorporate any of the other features disclosed herein. Various operations in the method 1100 may be omitted or rearranged, as necessary.

While the examples above described customized metrics that include\a metric term followed by an operator followed by a metric term, it is understood that such an ordering is merely exemplary, and other possible orderings of terms, values, and operators may be utilized. For example, in some embodiments, the typeahead control system 200 may enable a user to generate a query with an operator followed by any number of values, such as "Square of A", "Log of A", "Sum of A and B", "Difference of A and B", "Greater of A and B", "Max of A, B, C, . . . ", "Min of A, B, C, . . . ", "Mean of A, B, C, . . . ", "Median of A, B, C, . . . ", "Mode of A, B, C, . . . ", and so on.

While various embodiments refer to a reporting tool and the generation of customized metrics, it is understood that the techniques described herein are applicable in other contexts, such as defining search query terms in a search query bar associated with a search engine, or setting targeting criteria associated with targeting content (e.g., online advertisements, online content, online campaigns, etc.). Accordingly, while various examples herein refer to metric terms, it is understood that other types of terms may be utilized instead. For example, in the case of defining search query terms in a search query bar, the embodiments described herein may be utilized to present the user with suggested terms describing products, services, objects, questions, locations, etc., in order to create a search query such as "car color is black and car year is 2012", or "upholstery fabric is polyester and acrylic", or "restaurants near Ann Arbor", and so on.

Example Mobile Device

Figure 12:
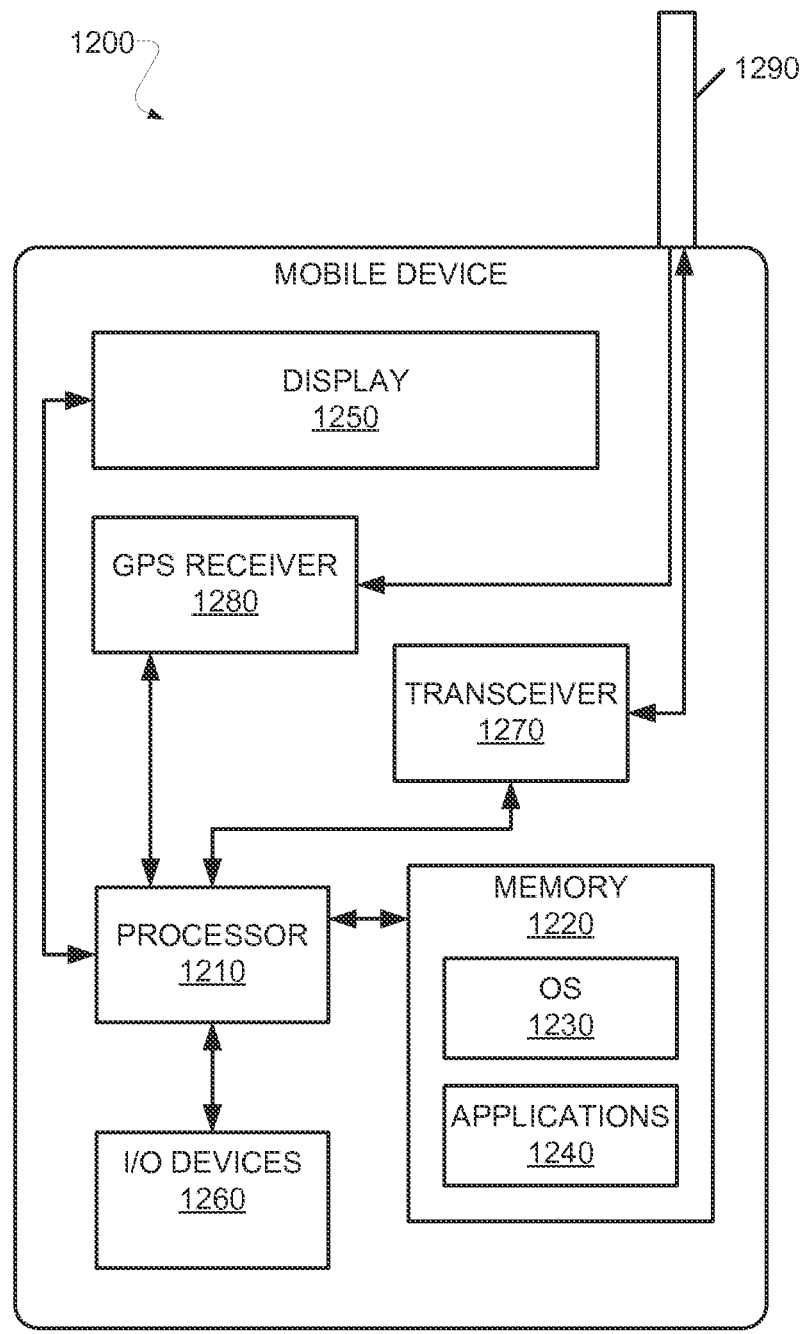
FIG. 12 illustrates an example mobile device, according to various embodiments.

FIG. 12 is a block diagram illustrating the mobile device 1200, according to an example embodiment. The mobile device may correspond to, for example, one or more client machines or application servers. One or more of the modules of the system 200 illustrated in FIG. 2 may be implemented on or executed by the mobile device 1200. The mobile device 1200 may include a processor 1210. The processor 1210 may be any of a variety of different types of commercially available processors suitable for mobile devices (for example, an XScale architecture microprocessor, a Microprocessor without Interlocked Pipeline Stages (MIPS) architecture processor, or another type of processor). A memory 1220, such as a Random Access Memory (RAM), a Flash memory, or other type of memory, is typically accessible to the processor 1210. The memory 1220 may be adapted to store an operating system (OS) 1230, as well as application programs 1240, such as a mobile location enabled application that may provide location based services to a user. The processor 1210 may be coupled, either directly or via appropriate intermediary hardware, to a display 1250 and to one or more input/output (I/O) devices 1260, such as a keypad, a touch panel sensor, a microphone, and the like. Similarly, in some embodiments, the processor 1210 may be coupled to a transceiver 1270 that interfaces with an antenna 1290. The transceiver 1270 may be configured to both transmit and receive cellular network signals, wireless data signals, or other types of signals via the antenna 1290, depending on the nature of the mobile device 1200. Further, in some configurations, a GPS receiver 1280 may also make use of the antenna 1290 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 13:
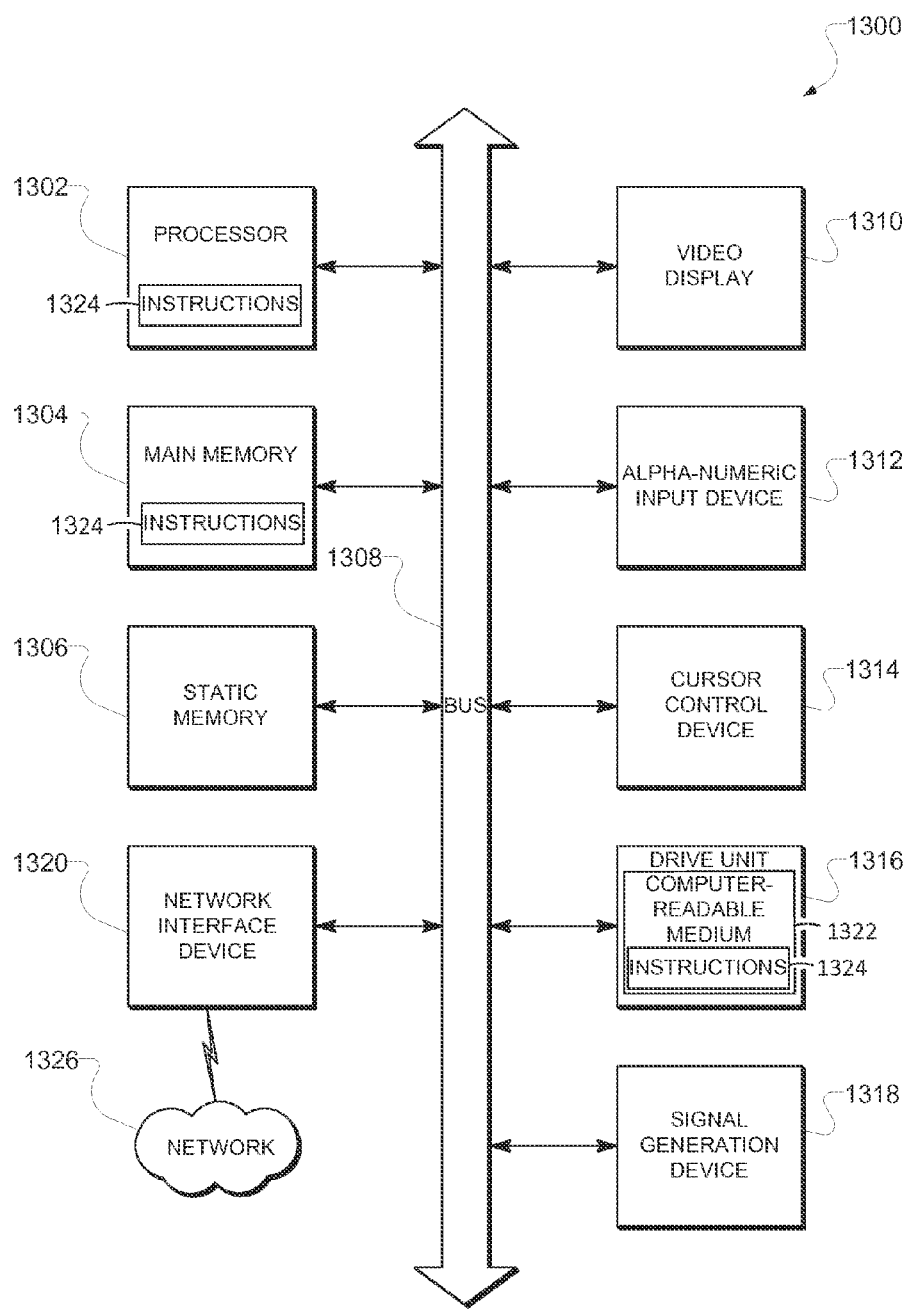
FIG. 13 is a diagrammatic representation of a machine in the example form of a computer system within which a set of instructions, for causing the machine to perform any one or more of the methodologies discussed herein, may be executed.

FIG. 13 is a block diagram of machine in the example form of a computer system 1300 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU) or both), a main memory 1304 and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g., a keyboard or a touch-sensitive display screen), a user interface (UI) navigation device 1314 (e.g., a mouse), a disk drive unit 1316, a signal generation device 1318 (e.g., a speaker) and a network interface device 1320.

Machine-Readable Medium

The disk drive unit 1316 includes a machine-readable medium 1322 on which is stored one or more sets of instructions and data structures (e.g., software) 1324 embodying or utilized by any one or more of the methodologies or functions described herein. The instructions 1324 may also reside, completely or at least partially, within the main memory 1304 and/or within the processor 1302 during execution thereof by the computer system 1300, the main memory 1304 and the processor 1302 also constituting machine-readable media.

While the machine-readable medium 1322 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1324 may further be transmitted or received over a communications network 1326 using a transmission medium. The instructions 1324 may be transmitted using the network interface device 1320 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi, LTE, and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
determining that a user has specified a first metric term via a user interface of a client device;
generating, based on historical user input pertaining to operators previously specified, by one or more users, after the first metric term, a list of one or more suggested operators associated with the first metric term, and causing, via the user interface, the list of one or more suggested operators to be displayed;
determining that the user has selected, via the user interface, one of the suggested operators included in the displayed list of one or more suggested operators;
generating a list of one or more suggested metric terms associated with the selected operator, and causing, via the user interface, the list of one or more suggested metric terms to be displayed;
determining that the user has selected, via the user interface, a second metric term from the suggested metric terms included in the list of one or more suggested metric terms; and
generating, using one or more hardware processors, a custom metric definition data entity in a database, the custom metric definition data entity storing a custom metric definition for a custom metric, the generating of the custom metric definition data entity being based on the first metric term specified by the user and the second metric term selected by the user from the list of one or more suggested metric terms associated with the selected operator, the custom metric definition specifying that metric values associated with the custom metric are generated by processing metric values associated with the first metric term and metric values associated with the second metric term based on the selected operator.

2. The method of claim 1, further comprising:
generating, based on the custom metric definition data entity, a metric report describing one or more metric values of the custom metric.

3. The method of claim 2, wherein the metric report includes a chart displaying the one or more metric values of the custom metric in association with one or more time values.

4. The method of claim 1, further comprising:
displaying, via the user interface, an icon representing the custom metric definition data entity.

5. The method of claim 1, further comprising:
determining that the user has specified multiple custom metric definition data entities associated with multiple custom metrics; and
generating, based on the multiple custom metric definition data entities, a metric report describing one or more metric values associated with each of the multiple custom metrics.

6. The method of claim 5, wherein the metric report includes a table including multiple columns associated with the multiple custom metrics and further including multiple rows associated with multiple time values, each entry in the table displaying a metric value associated with one of the multiple custom metrics and one of the multiple time values.

7. The method of claim 5, further comprising:
displaying, via the user interface, multiple icons representing each of the multiple custom metric definition data entities.

8. The method of claim 1, wherein the selected operator is at least one of an addition operator, a subtraction operator, a multiplication operator, a division operator, an is operator, an is not operator, an and operator, an or operator, or a nor operator.

9. The method of claim 1, wherein the first metric term represents at least one of a number of users, a number of content views, or a number of actions performed.

10. The method of claim 1, wherein the user interface includes a text entry user interface element, and wherein the list of one or more suggested operators and the additional list of additional metric terms are displayed via a typeahead user interface feature in conjunction with the text entry user interface element.

11. The method of claim 1, wherein the generating of the list of one or more suggested operators associated with the first metric term further comprises:
accessing a first data structure identifying one or more candidate metric terms and one or more candidate operators associated with each of the candidate metric terms;
identifying a specific one of the candidate metric terms that corresponds to the first metric term; and
classifying the one or more candidate operators associated with the specific candidate metric term as the suggested operators.

12. The method of claim 11, wherein the generating of the list of one or more suggested metric terms associated with the selected operator further comprises:
accessing a second data structure identifying one or more candidate operators and one or more candidate metric terms associated with each of the candidate operators;
identifying a specific one of the candidate operators that corresponds to the selected operator; and
classifying the one or more candidate metric terms associated with the specific candidate operator as the suggested metric terms.

13. The method of claim 12, wherein the determining that the user has specified the first metric term further comprises:
detecting user entry of one or more characters associated with the first metric term;
performing a search of a third data structure based on the one or more characters;
displaying one or more search results associated with the search as the list of one or more suggested metric terms; and
receiving a user selection of one of the search results.

14. The method of claim 1, wherein the determining that the user has specified the first metric term further comprises detecting user entry of a whitespace character subsequent to user entry of the first metric term, and wherein the list of one or more suggested operators is generated and caused to be displayed responsive to the user entry of the whitespace character.

15. The method of claim 14, wherein the list of one or more suggested operators is generated and caused to be displayed, prior to user entry of any additional character subsequent to the whitespace character.

16. The method of claim 1, wherein the determining that the user has selected one of the suggested operators further comprises detecting user entry of a whitespace character subsequent to the user selection of the selected operator, and
wherein the list of one or more suggested metric terms is generated and displayed responsive to the user entry of the whitespace character.

17. The method of claim 16, wherein the list of one or more suggested metric terms is generated and displayed, prior to user entry of any additional character subsequent to the whitespace character.

18. The method of claim 1, further comprising:
generating a list of one or more additional suggested operators associated with the second metric term, and displaying, via the user interface, the list of additional suggested operators;
determining that the user has selected, via the user interface, a second operator from the additional suggested operators included in the list of additional suggested operators;
generating a list of one or more additional suggested metric terms associated with the second operator, and displaying, via the user interface, the list of additional suggested metric terms associated with the second operator;
determining that the user has selected, via the user interface, a third metric term from the additional suggested metric terms included in the list of additional suggested metric terms; and
generating an additional custom metric definition data entity that references information defining an additional custom metric based on the first metric term, the selected operator, the second metric term, the second operator, and the third metric term.

19. A system comprising:
one or more hardware processors; and
a non-transitory machine-readable medium for storing instructions that, when executed by the one or more hardware processors, cause the one or more hardware processors to perform operations comprising:
determining that a user has specified a first metric term via a user interface of a client device;
generating, based on historical user input pertaining to operators previously specified, by one or more users, after the first metric term, a list of one or more suggested operators associated with the first metric term, and causing, via the user interface, the list of one or more suggested operators to be displayed;
determining that the user has selected, via the user interface, one of the suggested operators included in the displayed list of one or more suggested operators;
generating a list of one or more suggested metric terms associated with the selected operator, and causing, via the user interface, the list of one or more suggested metric terms to be displayed;
determining that the user has selected, via the user interface, a second metric term from the suggested metric terms included in the list of one or more suggested metric terms; and
generating a custom metric definition data entity in a database, the custom metric definition data entity storing a custom metric definition for a custom metric, the generating of the custom metric definition data entity being based on the first metric term specified by the user and the second metric term selected by the user from the list of one or more suggested metric terms associated with the selected operator, the custom metric definition specifying that metric values associated with the custom metric are generated by processing metric values associated with the first metric term and metric values associated with the second metric term based on the selected operator.

20. A non-transitory machine-readable storage medium comprising instructions that, when executed by one or more hardware processors of a machine, cause the machine to perform operations comprising:
determining that a user has specified a first metric term via a user interface of a client device;
generating, based on historical user input pertaining to operators previously specified, by one or more users, after the first metric term, a list of one or more suggested operators associated with the first metric term, and causing, via the user interface, the list of one or more suggested operators to be displayed;
determining that the user has selected, via the user interface, one of the suggested operators included in the displayed list of one or more suggested operators;
generating a list of one or more suggested metric terms associated with the selected operator, and causing, via the user interface, the list of one or more suggested metric terms to be displayed;
determining that the user has selected, via the user interface, a second metric term from the suggested metric terms included in the list of one or more suggested metric terms; and
generating a custom metric definition data entity in a database, the custom metric definition data entity storing a custom metric definition for a custom metric, the generating of the custom metric definition data entity being based on the first metric term specified by the user and the second metric term selected by the user from the list of one or more suggested metric terms associated with the selected operator, the custom metric definition specifying that metric values associated with the custom metric are generated by processing metric values associated with the first metric term and metric values associated with the second metric term based on the selected operator.

* * * * *